United States Patent [19]

Ward

[11] 4,364,828

[45] Dec. 21, 1982

[54] FILTER APPARATUS

[76] Inventor: Raymond E. Ward, 1905 N. Val Vista, Mesa, Ariz. 85205

[21] Appl. No.: 223,858

[22] Filed: Jan. 9, 1981

[51] Int. Cl.³ ............................................. B01D 27/08
[52] U.S. Cl. ................................. 210/232; 210/282; 53/467; 206/536
[58] Field of Search ...................... 210/282, 232, 245; 53/452, 454, 467, 468, 266 R, 560, 558; 206/533, 536, 537, 540

[56] References Cited

U.S. PATENT DOCUMENTS

| | | | |
|---|---|---|---|
| 662,353 | 11/1900 | Clement | 206/540 |
| 1,775,959 | 9/1930 | Himes | 206/540 |
| 2,162,853 | 6/1939 | Massey | 53/468 |
| 2,372,290 | 3/1945 | Pawelsky et al. | 53/467 |
| 2,630,227 | 3/1953 | Rodwell | 210/282 |
| 3,746,174 | 7/1973 | Watanabe | 210/282 |
| 3,871,522 | 3/1975 | Feldman | 206/540 |

Primary Examiner—Benoit Castel
Attorney, Agent, or Firm—Harry M. Weiss

[57] ABSTRACT

This disclosure relates to an apparatus for packaging filtering elements in a filter device, which incorporates first and second rotatably communicating case portions respectively having alignable apertures, which apertures can be aligned to permit the filter elements to be loaded into the case, and which apertures can be misaligned to seal the filter elements within the case.

2 Claims, 7 Drawing Figures

FILTER APPARATUS

BACKGROUND OF THE INVENTION

1. Field of the Invention

This invention relates generally to packaging apparatus, and, more specifically, to a packaging apparatus for a multiplicity of filtering elements.

2. Description of the Prior Art

In the past, filter devices have been widely used to remove contaminants from fluids. A relatively recent development has been the point-of-use water filter, which is used to filter water intended for human consumption. As the public demand for and acceptance of such point-of-use filters were substantially price dependent, a need existed for production-efficient designs and methods to provide concomitant cost reductions in the manufacture of such devices.

SUMMARY OF THE INVENTION

In accordance with one embodiment of this invention, it is an object to provide a package for a plurality of filtering elements.

It is another object to provide a package for a plurality of filtering elements which has first and second case portions which can be respectively rotated to seal the filtering elements within.

It is still a further object to teach an apparatus for packaging a multiplicity of filtering elements by rotating communicating case portions to close a fill aperture through which the filtering elements were loaded and then welding the case portions together to effect a seal.

DESCRIPTION OF THE PREFERRED EMBODIMENTS

In accordance with one embodiment of this invention, a package for a filter apparatus having a multiplicity of filtering elements is disclosed, comprising: means for enclosing the filtering elements; and filling means for permitting the filtering elements to be both placed and sealed within the case member.

The foregoing and other objects, features and advantages will be apparent from the following, more particular, description of the preferred embodiments of the invention, as illustrated in the accompanying drawing.

THE SPECIFICATION

Figure 1:
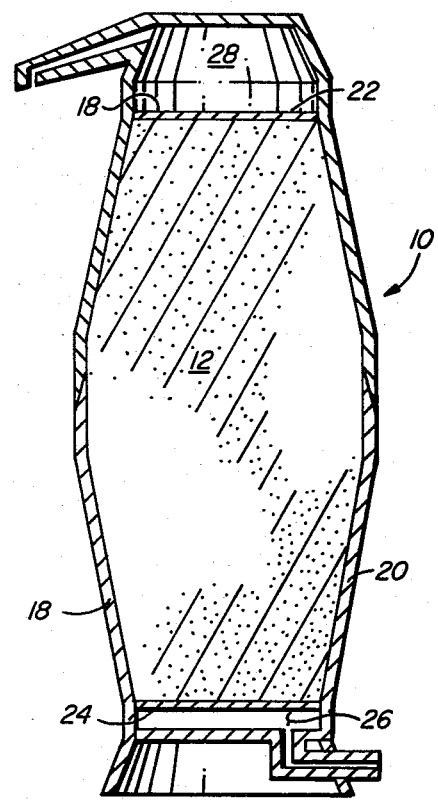
FIG. 1 is a sectional view of a point-of-use water filter apparatus.

Referring to FIG. 1, a sectional elevational view of a filter apparatus is shown generally by reference number 10. The filter 10 is comprised of a package 18 filled with a filter bed 12. The filter bed 12 is comprised of a multiplicity of filtering elements, as for example activated charcoal particles. The filter bed 12 is retained within the filter 10 by the package 18, which includes a case 20 and a pair of baffles 22, 24. The baffles 22, 24 respectively define inlet and outlet chambers 26, 28 within the case 20.

Figure 2:
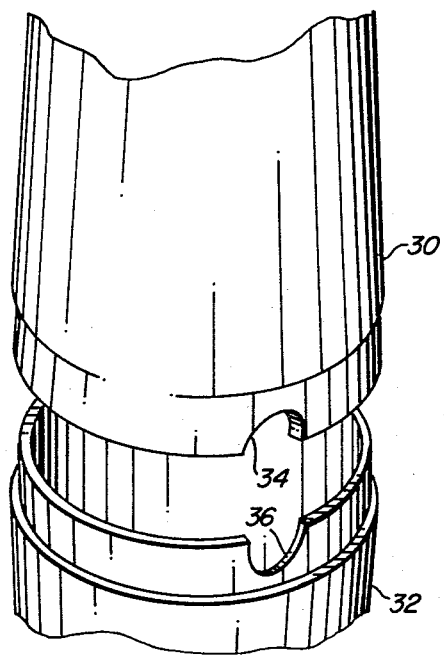
FIG. 2 is an exploded, partial, perspective view of the mating portions of the herein disclosed case apparatus.
Figure 4:
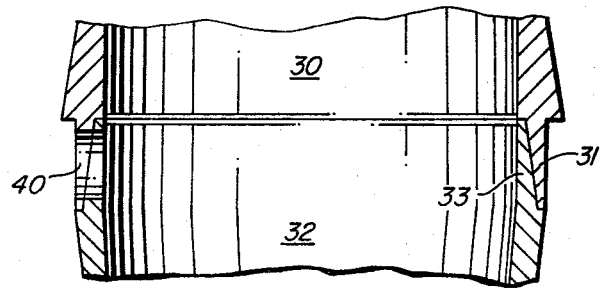
FIG. 4 is a partial, sectional view taken along line 4—4 of FIG. 3.

Referring then to FIGS. 2 and 4, a perspective view of upper and lower mating portions, or halves, of the case 20 are respectively shown by reference numbers 30, 32. The lower case half 32 is provided with a male portion 33 which is disposed to enter the upper case half 30, and thereby establish an overlapping region. The upper and lower case halves 30, 32 are respectively provided with case apertures 34, 36. The case apertures 34, 36 pierce the respective case halves 30, 32 in the region which overlaps when the male portion 33 of the lower case half 32 is inserted into the upper case half 30.

Figure 3:
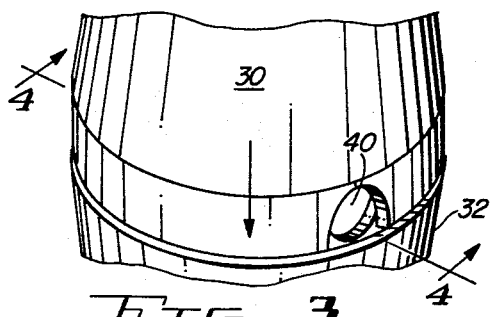
FIG. 3 is a partial, perspective view of the case portions of FIG. 2 in full communication.

Referring to FIG. 3, the lower case half 32 is shown with the male portion 33 inserted into the upper case half 30, and with the case apertures 34, 36 aligned to form a common fill aperture 40.

Figure 5:
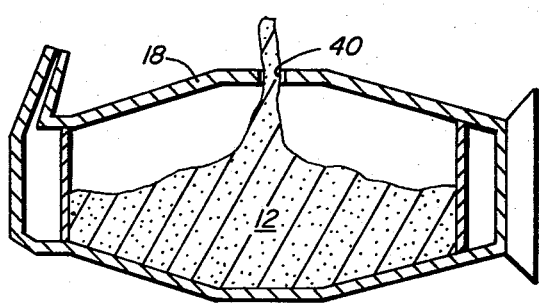
FIG. 5 is a sectional view of the herein disclosed case apparatus being loaded with filtering elements through a fill aperture.

Referring further to FIG. 4, a sectional view taken along line 4—4 of FIG. 3 is shown. The overlap of the case portions 30, 32 is clearly shown, with the male portion 33 of the lower case half 32 fitting snugly within a corresponding female portion 31 of the upper case half 30. The common fill aperture 40 thus passes through both the male and female portions 33, 31. Referring also to FIG. 5, the case 18 is shown being filled with the filter bed 12, through the common fill aperture 40.

Figure 6:
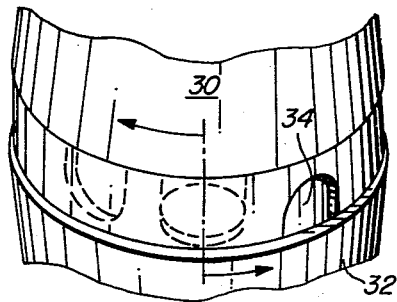
FIG. 6 is a partial, perspective view of the case portions of FIG. 3 having been rotated to seal the fill aperture.

FIG. 6 is an illustration of the mating region between the upper and lower case halves 30, 32 after having been rotated with the overlaping regions 31, 33 maintained in communication. As shown, the relative rotation of the case halves 30, 32 misaligns the apertures 34, 36, and thereby seals the filling aperture 40. The mating surfaces of the case halves 30, 32 can then be permanently bonded together, by well known means such as solvent welding, ultrasonic welding, etc. Thus, a method for filling and sealing the case 18 is provided which requires no additional parts other than the case halves 30, 32.

Figure 7:
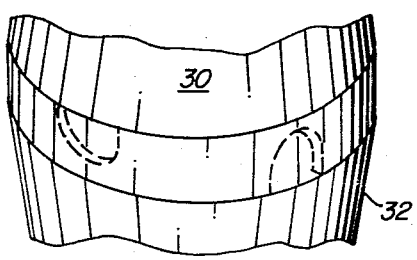
FIG. 7 is a partial perspective view of the case portions of FIG. 3 with a trim ring mounted over the communicating regions.

Referring finally to FIG. 7, a perspective view of the mating region of the case halves 30, 32 is shown with a trim ring installed over the overlapping portions of the case halves 30, 32.

While the invention has been particularly described and shown in reference to the preferred embodiments thereof, it will be understood by those skilled in the art that various changes in form and detail and omissions may be made therein without departing from the spirit and scope of the invention.

What is claimed is:

1. A filter apparatus, comprising:
   a multiplicity of particulate filtering elements:
   case means having first and second case members defining a cavity for enclosing said filtering elements;
   said case means defining a fluid inlet and a fluid outlet;
   filling means for permitting said filtering elements to be placed within said case means between said inlet and said outlet;
   said filling means including said first and second case members respectively provided with rotatably communicating overlapping portions;

said filling means also including said first and second case members respectively having first and second apertures through said overlapping portions;

said filling means having first and second baffle members respectively in communication with the internal circumferential surfaces of said first and second case members so that placement of said filtering elements within said cavity biases said baffle members against said case members to define inlet and outlet chambers respectively open to said inlet and outlet, said filling means further including said first and second apertures having alignability so that said case members can be loaded with said filtering elements through said first and second apertures when aligned and further so that said filtering elements can be sealed within said case members by rotating said first and second case members relative to one another to misalign said first and second apertures; and sealing means for permanently sealing said first and second case members together with said first and second apertures in a mis-aligned condition so that said filtering elements can be sealed within said cavity.

2. A filter apparatus in accordance with claim 1 wherein said case members each have a maximal girth at said overlapping portions.

* * * * *